(12) United States Patent
Luo et al.

(10) Patent No.: US 11,571,981 B2
(45) Date of Patent: Feb. 7, 2023

(54) BATTERY EQUALIZATION SYSTEM, VEHICLE, BATTERY EQUALIZATION METHOD AND STORAGE MEDIUM

(71) Applicant: BYD COMPANY LIMITED, Guangdong (CN)

(72) Inventors: Hongbin Luo, Shenzhen (CN); Chao Wang, Shenzhen (CN); Xiaofeng Shen, Shenzhen (CN); Chengzhi Wang, Shenzhen (CN); Qiuyong Zeng, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 328 days.

(21) Appl. No.: 16/642,816

(22) PCT Filed: Aug. 31, 2018

(86) PCT No.: PCT/CN2018/103684
§ 371 (c)(1),
(2) Date: Feb. 27, 2020

(87) PCT Pub. No.: WO2019/042440
PCT Pub. Date: Mar. 7, 2019

(65) Prior Publication Data
US 2020/0346552 A1  Nov. 5, 2020

(30) Foreign Application Priority Data
Aug. 31, 2017 (CN) .......................... 201710776104.5

(51) Int. Cl.
*B60L 53/62* (2019.01)
*B60L 58/13* (2019.01)
(Continued)

(52) U.S. Cl.
CPC ............... *B60L 53/62* (2019.02); *B60L 58/13* (2019.02); *B60L 58/22* (2019.02); *H01M 10/42* (2013.01);
(Continued)

(58) Field of Classification Search
CPC .......... B60L 53/62; B60L 58/22; B60L 58/13; H02J 7/0049; H02J 7/0018; H02J 7/0019
See application file for complete search history.

(56) References Cited

U.S. PATENT DOCUMENTS

| | | | |
|---|---|---|---|
| 7,489,106 B1 * | 2/2009 | Tikhonov | ................ B60L 58/15 320/120 |
| 2003/0044689 A1 * | 3/2003 | Miyazaki | ................ B60L 50/64 320/134 |

(Continued)

FOREIGN PATENT DOCUMENTS

| | | |
|---|---|---|
| CN | 102957173 A | 3/2013 |
| CN | 103166257 A | 6/2013 |

(Continued)

OTHER PUBLICATIONS

Zhang, Guiping, CN203504265U Translation, Mar. 2014. (Year: 2014).*

(Continued)

*Primary Examiner* — Drew A Dunn
*Assistant Examiner* — Pamela J Jeppson
(74) *Attorney, Agent, or Firm* — Calfee Halter & Griswold LLP

(57) ABSTRACT

The present application discloses a battery equalization system, a vehicle, a battery equalization method, and a storage medium. The battery equalization system includes: a collection circuit; an equalization circuit; a controller; a charging branch circuit, connected to a charging device and a battery pack; and a first power supply branch circuit, (Continued)

connected to the charging device and the battery equalization system, and configured to supply power to the battery equalization system. When a state-of-charge of the battery pack is full and a cell in the battery pack needs enabling of equalization, the controller controls the charging branch circuit to disconnect, and controls the first power supply branch circuit to keep connected, so that an equalization module performs equalization processing on the cell that needs enabling of equalization.

17 Claims, 5 Drawing Sheets

(51) Int. Cl.
*H02J 7/00* (2006.01)
*B60L 58/22* (2019.01)
*H01M 10/42* (2006.01)

(52) U.S. Cl.
CPC .......... *H02J 7/0018* (2013.01); *H02J 7/0019* (2013.01); *H02J 7/0049* (2020.01); *H02J 7/00* (2013.01); *Y02T 10/7072* (2013.01)

(56) References Cited

U.S. PATENT DOCUMENTS

| | | | | |
|---|---|---|---|---|
| 2011/0074354 A1* | 3/2011 | Yano | ................... | H01M 10/441 180/65.29 |
| 2012/0223582 A1 | 9/2012 | Andrea | | |
| 2012/0306266 A1* | 12/2012 | Ohnuki | ................... | B60L 8/003 307/9.1 |
| 2013/0030618 A1* | 1/2013 | Blakemore | ........... | H02J 7/0016 701/22 |
| 2013/0069594 A1* | 3/2013 | Jung | ................... | H01M 10/441 320/112 |
| 2016/0190829 A1* | 6/2016 | Mei | ...................... | H01M 4/5825 320/112 |
| 2017/0071431 A1 | 3/2017 | Reed et al. | | |
| 2017/0141586 A1 | 5/2017 | Pernyeszi | | |

FOREIGN PATENT DOCUMENTS

| | | | | |
|---|---|---|---|---|
| CN | 103199580 A | | 7/2013 | |
| CN | 103378618 A | | 10/2013 | |
| CN | 203504265 U | * | 3/2014 | ................ H02J 7/00 |
| CN | 103701171 A | | 4/2014 | |
| CN | 104106175 A | | 10/2014 | |
| EP | 2582010 A1 | | 4/2013 | |
| EP | 3160002 A1 | * | 4/2017 | ............ H02J 7/0018 |
| KR | 20160125205 A | | 10/2016 | |
| TW | 201714341 A | | 4/2017 | |

OTHER PUBLICATIONS

Search Report for International Application No. PCT/CN2018/103684 dated Nov. 28, 2018.

* cited by examiner

BATTERY EQUALIZATION SYSTEM, VEHICLE, BATTERY EQUALIZATION METHOD AND STORAGE MEDIUM

CROSS-REFERENCE TO RELATED APPLICATIONS

The present application is based on International Application No. PCT/CN2018/103684, filed on Aug. 31, 2018, and claims priority to Chinese Patent Application No. 201710776104.5, filed on Aug. 31, 2017, which are incorporated herein by reference in their entireties.

FIELD

The present application relates to the battery pack equalization field, and in particular, to a battery equalization system, a vehicle, a battery equalization method, and a storage medium.

BACKGROUND

A battery pack is an important part of an electric vehicle. A battery pack is multiple cells connected in series. While a battery is in use, the difference between the cells in the battery pack gradually increases, resulting in poor consistency between the battery cells. Due to the short stave effect of the battery, the capacity of a battery pack cannot be brought into full play, thereby decreasing the overall capacity of the battery pack. Therefore, managing equalization of the battery pack of an electric vehicle effectively is helpful to improve the consistency between the cells in the battery pack, reduce the capacity loss of the battery, and extend the battery life and the mileage of the electric vehicle, and is of great significance.

In the practical application of related equalization technologies, main operations in a battery charging and discharging process are to collect battery information, determine whether equalization needs to be enabled for the battery and whether equalization processing needs to be performed for the battery, in which equalization efficiency is low and equalization time is long.

SUMMARY

The objective of the present application is to provide a battery equalization system, a vehicle, a battery equalization method, and a storage medium to resolve the technical problem of low equalization efficiency of a battery equalization system in the related art.

To achieve the above objective, the present application provides a power supply circuit of a battery equalization system, including:

a collection circuit, configured to collect parameter information of cells in a battery pack;

an equalization circuit, configured to perform equalization processing on the cells in the battery pack;

a controller, connected to the collection circuit and the equalization circuit, and configured to: when it is determined, according to the parameter information of the cells in the battery pack, that a cell in the battery pack needs enabling of equalization, control the equalization circuit to perform equalization processing on the cell that needs enabling of equalization;

a charging branch circuit, connected to a charging device and the battery pack, and configured to charge the battery pack; and a first power supply branch circuit, connected to the charging device and the battery equalization system, and configured to supply power to the battery equalization system, where when a state-of-charge of the battery pack is full and a cell in the battery pack needs enabling of equalization, the controller controls the charging branch circuit to disconnect, and controls the first power supply branch circuit to keep connected, so that an equalization module performs equalization processing on the cell that needs enabling of equalization.

Optionally, the charging branch circuit is connected to a high-voltage direct current output terminal of the charging device, and the first power supply branch circuit is connected to a low-voltage direct current output terminal of the charging device.

Optionally, a first switch controlled by the controller is disposed on the first power supply branch circuit, one side of the first switch is connected to the low-voltage direct current output terminal of the charging device, and the other side of the first switch is connected to the controller.

Optionally, the battery equalization system further includes a second power supply branch circuit, one end of the second power supply branch circuit is connected to the controller, and the other end of the second power supply branch circuit is connected to the collection circuit and the equalization circuit.

Optionally, a second switch controlled by the controller is disposed on the second power supply branch circuit, and the second switch keeps connected under the control of the controller.

Optionally, a second switch controlled by the controller is disposed on the second power supply branch circuit; when the equalization circuit performs equalization processing on the cell that needs enabling of equalization, the second switch changes from a connected state to a disconnected state under the control of the controller, so that the battery pack supplies power to the equalization circuit and the collection circuit.

Optionally, after the second switch is disconnected, the controller periodically gets into a sleep mode; when the controller exits the sleep mode, the controller controls the second switch to get connected to obtain the parameter information of the cells in the battery pack and a remaining duration of equalization processing still to be performed by the equalization circuit on the cell that needs enabling of equalization.

Optionally, the controller is respectively connected through two channels to the collection circuit and the equalization circuit that correspond to a same cell.

Optionally, the controller includes a control chip, and the control chip is respectively connected through two pins to the collection circuit and the equalization circuit that correspond to the same cell, the two pins are in one-to-one correspondence to the two channels, one of the two pins is connected to the equalization circuit through one of the two channels, and the other of the two pins is connected to the collection circuit through the other of the two channels.

Optionally, the controller is connected through one channel to the collection circuit and the equalization circuit that correspond to a same cell, and the collection circuit and the equalization circuit multiplex the channel in a time division manner.

Optionally, the controller includes a control chip, the control chip is connected through one pin to the collection circuit and the equalization circuit that correspond to the same cell, and the pin is connected to the equalization circuit and the collection circuit through the channel.

Optionally, the controller is further configured to: when it is determined, according to the parameter information of the battery pack, that a cell in the battery pack needs enabling of equalization, obtain a target equalization duration of the cell that needs enabling of equalization, and control, according to the target equalization duration of the cell that needs enabling of equalization, the equalization circuit to perform equalization processing on the cell that needs enabling of equalization.

Optionally, the controller controls, according to the target equalization duration and an equalization duty cycle, the equalization circuit to perform equalization processing on the cell that needs enabling of equalization, the equalization duty cycle is a ratio of an equalization period of the cell that needs enabling of equalization to a unit cycle, and the unit cycle includes the equalization period and a collection period.

The present application further provides a vehicle, including the battery equalization system.

The present application further provides a battery equalization method, applied to a vehicle including the battery equalization system, where the method includes:

collecting parameter information of cells in a battery pack when a state-of-charge of the battery pack is full;

controlling, when it is determined, according to the parameter information of cells in a battery pack, that a cell in the battery pack needs enabling of equalization, a charging branch circuit to disconnect, and controlling a first power supply branch circuit to keep connected; and controlling, by a controller after the first power supply branch circuit is connected, an equalization circuit to perform equalization processing on the cell that needs enabling of equalization.

Optionally, the battery equalization system further includes a second power supply branch circuit, one end of the second power supply branch circuit is connected to the controller, and the other end of the second power supply branch circuit is connected to the collection circuit and the equalization circuit.

The method further includes:

controlling, by the controller, the second power supply branch circuit to change from a connected state to a disconnected state, so that the battery pack supplies power to the equalization circuit and the collection circuit.

Optionally, after the second power supply branch circuit is disconnected, the method further includes:

getting into a sleep mode periodically by the controller; and controlling, by the controller when the controller exits the sleep mode, the second power supply branch circuit to get connected to obtain the parameter information of the cells in the battery pack and a remaining duration of equalization processing still to be performed by the equalization circuit on the cell that needs enabling of equalization.

Optionally, the controller is connected through one channel to the collection circuit and the equalization circuit that correspond to a same cell, and the collection circuit and the equalization circuit multiplex the channel in a time division manner.

The determining that a cell in the battery pack needs enabling of equalization includes:

obtaining, by the controller when it is determined, according to the parameter information of cells in the battery pack, that a cell in the battery pack needs enabling of equalization, a target equalization duration and an equalization duty cycle of the cell that needs enabling of equalization, the equalization duty cycle is a ratio of an equalization period of the cell that needs enabling of equalization to a unit cycle, and the unit cycle includes the equalization period and a collection period; and the controlling, by a controller, an equalization circuit to perform equalization processing on the cell that needs enabling of equalization includes:

controlling, by the controller according to the target equalization duration and the equalization duty cycle of the cell that needs enabling of equalization, the equalization circuit to perform equalization processing on the cell that needs enabling of equalization.

The present application further provides a computer-readable storage medium, on which a computer program instruction is stored. When executed by a processor, the program instruction implements the battery equalization method.

The technical solutions provided in the embodiments of the present application may include the following beneficial effects:

The present application improves the electrical connection structure of the battery equalization system. When the state-of-charge of the battery pack of the charging device is full and a cell in the battery pack needs enabling of equalization, by controlling the first power supply branch circuit to stay in the connected state, the present application enables the charging device to supply power to the controller through the first power supply branch circuit. Further, the controller can continue to control the equalization circuit to perform equalization processing on the cell that needs enabling of equalization, thereby extending the battery equalization time, improving the battery equalization effect, and resolving the technical problem of low equalization efficiency of the battery equalization system in the related art.

Other features and advantages of the present application will be described in detail in the following detailed description.

BRIEF DESCRIPTION OF THE DRAWINGS

The accompanying drawings are used to provide a further understanding of the present application, constitute a part of the specification, are used to explain the present application together with the following specific implementations, but do not constitute a limitation on the present application. In the accompanying drawings.

DETAILED DESCRIPTION

The specific implementations of the present application will be described in detail below with reference to the accompanying drawings. It should be understood that, the specific implementations described herein are only used to illustrate and explain the present application, and are not intended to limit the present application.

Figure 1:
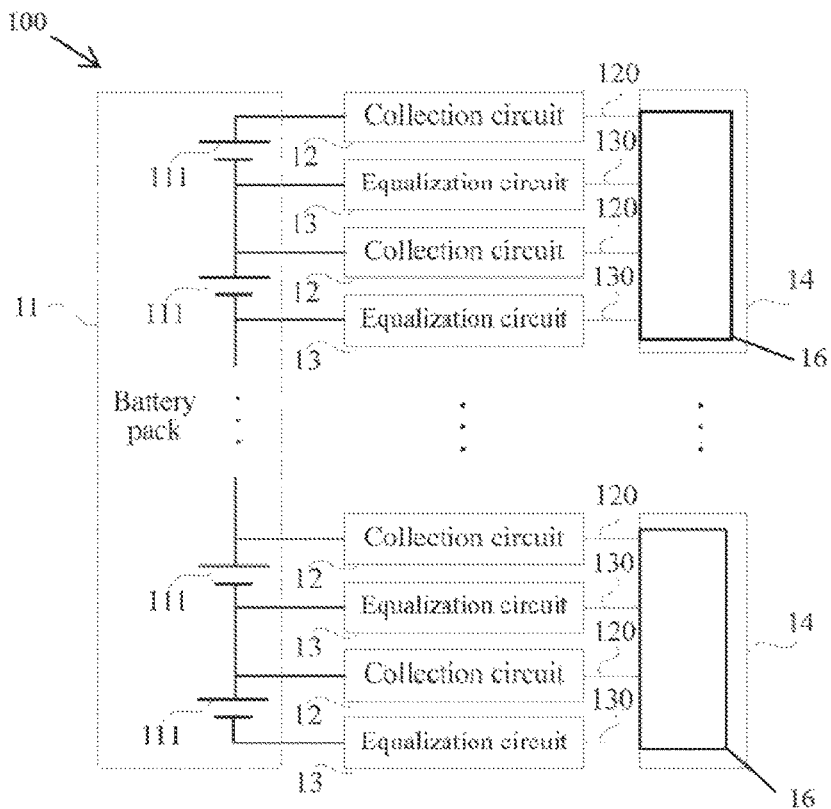
FIG. 1 is a block diagram of a battery equalization unit according to an exemplary embodiment.
Figure 2:
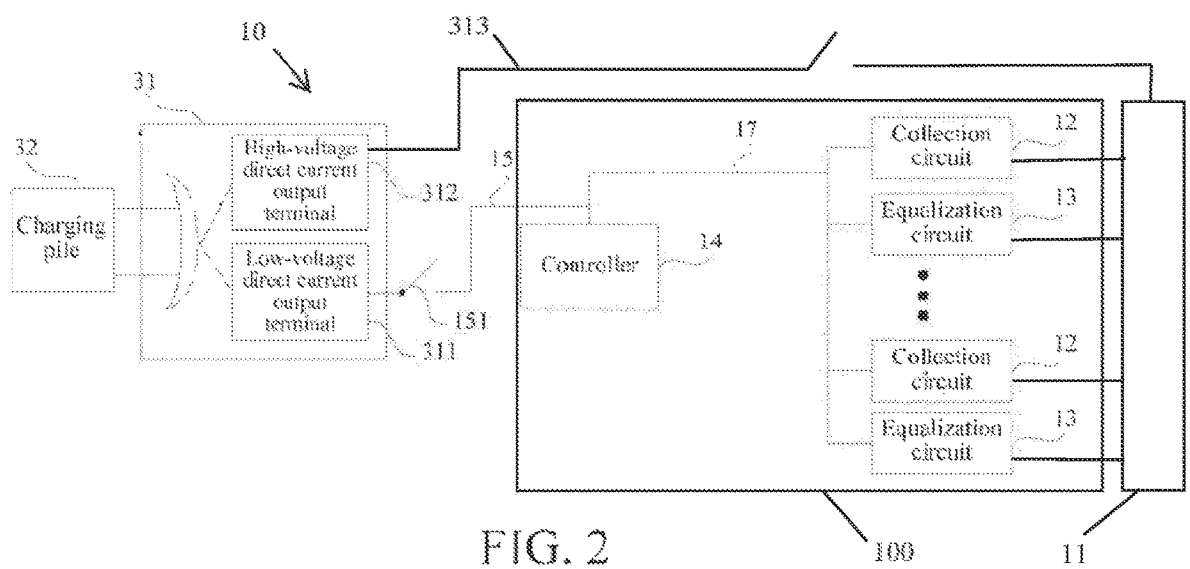
FIG. 2 is a schematic diagram of a power supply branch circuit in a battery equalization system according to an exemplary embodiment.

FIG. 1 is a block diagram of a battery equalization unit 100 according to an exemplary embodiment; and FIG. 2 is a schematic diagram of a power supply branch circuit in a battery equalization system 10 including the battery equalization unit 100 according to an exemplary embodiment. As shown in FIG. 1 and FIG. 2, the battery equalization system 10 includes a collection circuit 12, an equalization circuit 13, a controller 14, a charging branch circuit 313, a first power supply branch circuit 15, and a second power supply branch circuit 17.

As shown in FIG. 1 and FIG. 2, the charging branch circuit is connected to a charging device 31 and a battery pack 11, and is configured to charge the battery pack 11. The battery pack 11 is a power battery pack, and is multiple cells 111 connected in series, and is configured to provide a driving power for an entire vehicle. The charging device 31 includes a low-voltage direct current output terminal 311 and a high-voltage direct current output terminal 312.

To charge the battery pack 11, one side of the charging branch circuit is connected to the high-voltage direct current output terminal 312 of the charging device 31, and the other side of the charging branch circuit is connected to the battery pack 11. As shown in FIG. 2, the charging device 31 may be a vehicle-mounted charger. When the vehicle-mounted charger is connected to a charging pile 32, an alternating current mains supply output by the charging pile 32 charges the battery pack through the vehicle-mounted charger and the charging branch circuit. When a state-of-charge of the battery pack is full, the charging branch circuit is disconnected.

In FIG. 1, the controller 14 is respectively connected through two channels 120, 130 to the collection circuit 12 and the equalization circuit 13 that correspond to the same cell 111. Specifically, the controller 14 includes a control chip 16, and the control chip 16 is respectively connected through two pins to the collection circuit 12 and the equalization circuit 13 that correspond to the same cell 111. The two pins are in one-to-one correspondence to the two channels 120, 130. One of the two pins is connected to the equalization circuit 13 through the channel 130, and the other of the two pins is connected to the collection circuit 12 through the channel 120.

As shown in FIG. 1, the collection circuit 12 is configured to collect parameter information of the cell 111 in the battery pack 11, and transmit the collected parameter information of the battery pack to the controller 14. The cell 111 in the battery pack 11 is in one-to-one correspondence to the collection circuit 12. The parameter information includes information such as battery voltage and temperature. By connecting the channel 120, the controller 14 controls the collection circuit 12 to collect the parameter information of the battery pack 11.

As shown in FIG. 1 and FIG. 2, the equalization circuit 13 is configured to perform equalization processing on the cell 111 in the battery pack 11, and the cell 111 in the battery pack 11 is in one-to-one correspondence to the equalization circuit 13. When a cell 111 in the battery pack 11 needs to be equalized, the channel 130 between the equalization circuit 13 and the controller 14 is connected, so that the equalization circuit 13 can perform equalization processing on the cell 111 that needs to be equalized.

As shown in FIG. 1 and FIG. 2, the controller 14 is configured to: when it is determined, according to the parameter information of the cell 111 in the battery pack 11, that a cell 111 in the battery pack 11 needs enabling of equalization, connect the corresponding channel 130, and control the equalization circuit 13 to perform equalization processing on the cell 111 that needs to be equalized.

When the battery pack 11 stops being charged, the charging branch circuit 313 is disconnected. If a cell 111 in the battery pack 11 needs enabling of equalization, there is no power supply to support the battery equalization unit 100 to perform equalization processing. To enable continuous equalization on the battery pack 11 after the battery pack 11 stops being charged, referring to FIG. 2, the battery equalization system 10 includes a first power supply branch circuit 15. One side of the first power supply branch circuit 15 is connected to the charging device 31, and the other side of the first power supply branch circuit 15 is connected to the battery equalization unit 100. In FIG. 2, one side of the first power supply branch circuit 15 is connected to a low-voltage direct current output terminal 311 of the charging device 31, and the other side is connected to the controller 14.

As shown in FIG. 1 and FIG. 2, the first power supply branch circuit 15 is controlled by the controller 14. When the charging device 31 is connected to the charging pile 32 and the state-of-charge of the battery pack 11 is full, the charging branch circuit is disconnected. If a cell 111 in the battery pack 11 needs enabling of equalization, because the controller 14 controls the first power supply branch circuit 15 to keep connected, the alternating current mains supply output by the charging pile 32 at this time continues to supply power to the controller 14 through the charging device 31 and the first power supply branch circuit 15 to maintain the power required for operation of the controller 14. Because both the collection circuit 12 and the equalization circuit 13 are connected to the controller 14, when the charging pile 32 supplies power to the controller 14, the charging pile 32 can also supply power to the collection circuit 12 and the equalization circuit 13.

Optionally, when the charging device 31 is connected to the charging pile 32 and the battery pack 11 is being charged, if the controller 14 determines, according to the parameter information of the cell 111 in the battery pack 11, that a cell 111 in the battery pack 11 needs enabling of equalization, the controller 14 may also control the first power supply branch circuit 15 to stay in a connected state. Further, the alternating current mains supply output by the charging pile 32 supplies power to the controller 14 through the charging device 31 and the first power supply branch circuit 15 to maintain the power required for operation of the controller 14.

As shown in FIG. 1 and FIG. 2, when the battery equalization system performs equalization processing on the cell in a passive equalization manner, that is, discharges the cell that needs enabling of equalization, the controller 14 may determine, in the following way, the cell 111 that needs enabling of equalization:

First, according to the voltage value of each cell 111 in the battery pack 11 that is collected by the collection circuit 12, the smallest voltage value among the voltage values of the cells 111 in the battery pack 11 is used as a reference voltage value.

Then, according to a voltage difference between the voltage value of each cell 111 in the battery pack 11 and the reference voltage value, it is determined that the cell 111 whose voltage difference is greater than or equal to a preset voltage difference threshold is the cell 111 that needs enabling of equalization.

Certainly, in other embodiments, the cell that needs enabling of equalization may also be determined according to other parameter information of the battery pack. For example, when the battery equalization system performs equalization processing on the cell in an active equalization manner, that is, charges the cell that needs enabling of equalization, the greatest voltage value among the voltage values of the cells in the battery pack is used as a reference voltage value.

Optionally, when the controller 14 determines, according to the parameter information of the cell 111 in the battery pack 11, that a cell 111 in the battery pack 11 needs enabling of equalization, for example, according to the voltage value of the cell 111 that needs enabling of equalization and the reference voltage value, obtains a target equalization duration of the cell 111 that needs enabling of equalization, and according to the target equalization duration of the cell 111 that needs enabling of equalization, controls the equalization circuit 13 to perform equalization processing on the cell 111 that needs enabling of equalization.

Further, the controller 14 controls, according to the target equalization duration and an equalization duty cycle, the equalization circuit 13 to perform equalization processing on the cell 111 that needs enabling of equalization. The equalization duty cycle is a ratio of an equalization period of the cell 111 that needs enabling of equalization to a unit cycle. The unit cycle includes the equalization period and a collection period. In the collection period, the collection circuit 12 collects the parameter information of the battery pack 11; and in the equalization period, the equalization circuit 13 performs equalization processing on the cell 111 to be equalized in the battery pack 11.

For example, as shown in FIG. 1 and FIG. 2, the smallest voltage value among the voltage values of the cells 111 in the battery pack 11 may be used as the reference voltage value, and the preset voltage difference threshold may be 5 mV (or another value). First, the controller 14 obtains the smallest voltage value Vmin among the cells 111 through comparison, and determines whether the difference between the voltage value of each cell 111 in the battery pack 11 and Vmin is less than 5 mV. If the difference is less than 5 mV, the battery pack 11 is very consistent in equalization and needs no more equalization; if the difference is greater than 5 mV, the cell 111 with a difference between its voltage value and Vmin being greater than 5 mV is used as the cell 111 that needs enabling of equalization. At this time, if the charging device 31 is connected to the charging pile 32 and the state-of-charge of the battery pack 11 is full, the controller 14 controls the first power supply branch circuit 15 to get connected. Further, the alternating current mains supply output by the charging pile 32 continues to supply power to the controller 14 through the charging device 31 and the first power supply branch circuit 15. Subsequently, the controller 14 controls the equalization circuit 13 to discharge the cell 111 that needs enabling of equalization.

In the discharging process, the controller 14 may keep reading voltage information of the cell 111 that needs enabling of equalization, and determine whether the difference between Vmin and the voltage of the cell is less than 5 mV. If the difference is less than 5 mV, the discharge stops, and the equalization is ended. The controller 14 controls the first power supply branch circuit 15 to stay in the disconnected state, so that the controller 14 is powered off. If the difference is still greater than 5 mV, the controller continues to cyclically read the voltage information of the cell 111 that needs enabling of equalization until the difference between Vmin and the voltage of the cell is less than 5 mV. Thereafter the discharge stops, and the equalization is ended. The controller 14 controls the first power supply branch circuit 15 to stay in the disconnected state, so that the controller 14 is powered off.

After the cell 111 that needs enabling of equalization is determined, a target equalization duration of the cell 111 that needs enabling of equalization may also be calculated according to the voltage value of the cell 111 that needs enabling of equalization and Vmin. Further, after the discharge starts, a discharge duration of the cell 111 that needs enabling of equalization is counted. When the difference between the discharge duration of the cell 111 and the target equalization duration falls within a threshold range, the discharge stops, and the equalization ends. The controller 14 controls the first power supply branch circuit 15 to stay in the disconnected state, so that the controller 14 is powered off.

The present application improves the electrical connection structure of the battery equalization system. When the charging device is connected to the charging pile, the state-of-charge of the battery pack is full, and a cell in the battery pack needs enabling of equalization, by controlling the first power supply branch circuit to keep connected, the charging pile is enabled to supply power to the controller through the charging device and the first power supply branch circuit. Further, the controller can continue to control the equalization circuit to perform equalization processing on the cell that needs enabling of equalization, thereby extending the battery equalization time, improving the battery equalization effect, and resolving the technical problem of low equalization efficiency of the battery equalization system in the related art.

Referring to FIG. 2, a first switch 151 controlled by the controller 14 is disposed on the first power supply branch circuit 15. One side of the first switch 151 is connected to the low-voltage direct current output terminal 311, and the other side of the first switch 151 is connected to the controller 14.

Optionally, the first switch 151 may be a relay switch, and the controller 14 controls the first switch 151 by outputting a control signal. When the charging device 31 is connected to the charging pile 32, the state-of-charge of the battery pack 11 is full, and a cell 111 in the battery pack 11 needs enabling of equalization, the controller 14 outputs a control signal to the first switch 151. After receiving the control signal, the first switch 151 changes to a connected state. That is, the first power supply branch circuit 15 is connected. At this time, the alternating current mains supply output by the charging pile 32 continues to supply power to the controller 14 through the charging device 31 and the first power supply branch circuit 15 to maintain the power required for operation of the controller 14.

After the charging device 31 is connected to the charging pile 32, the state-of-charge of the battery pack 11 is full, and the equalization circuit 13 finishes the equalization processing on the cell that needs enabling of equalization, the controller 14 outputs a control signal to the first switch 151. After receiving the control signal, the first switch 151 changes to a disconnected state. That is, the first power supply branch 15 is in the disconnected state, and the controller 14 is powered off.

Optionally, after the vehicle is powered on, the controller 14 controls the first switch 151 to keep connected all the time. When the charging device 31 is connected to the charging pile 32, the state-of-charge of the battery pack 11 is full, and the equalization circuit 13 finishes the equalization processing on the cell that needs enabling of equalization, the controller 14 controls the first switch 151 to disconnect.

As shown in FIG. 2, the battery equalization system further includes a second power supply branch circuit 17. One end of the second power supply branch circuit 17 is connected to the controller 14, and the other end of the second power supply branch circuit 17 is connected to a collection circuit 12 and the equalization circuit 13. In FIG. 2, the second power supply branch circuit 17 keeps connected. Because the second power supply branch circuit 17 keeps connected all the time, when the alternating current mains supply output by the charging pile 32 supplies power to the controller 14 through the charging device 31 and the first power supply branch circuit 15, the mains alternating current can also be supplied to the collection circuit 12 and the equalization circuit 13 through the second power supply branch circuit 17.

Figure 3:
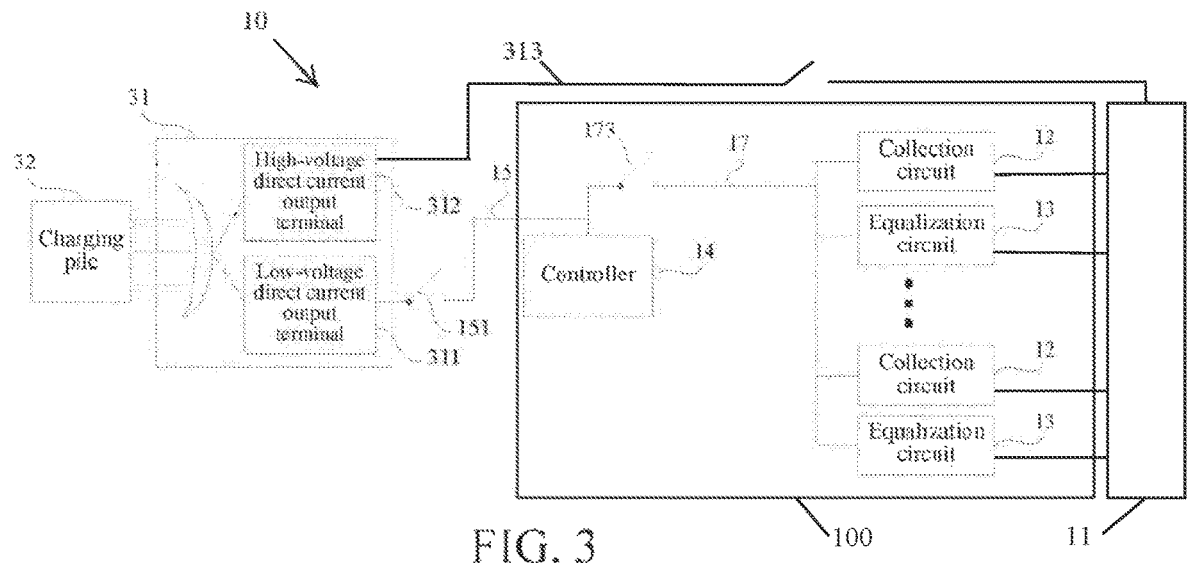
FIG. 3 is another schematic diagram of a power supply branch circuit in a battery equalization system according to an exemplary embodiment.

As shown in FIG. 3, FIG. 3 is a schematic diagram of another power supply branch circuit in a battery equalization system according to an exemplary embodiment. A second switch 173 controlled by the controller 14 is disposed on the second power supply branch circuit 17. One side of the second switch 173 is connected to the controller 14, and the other side of the second switch 173 is connected to the collection circuit 12 and the equalization circuit 13. The second switch 173 keeps connected under the control of the controller 14.

Optionally, as shown in FIG. 1 and FIG. 3, when the equalization circuit 13 performs equalization processing on the cell that needs enabling of equalization, the second switch 173 changes from a connected state to a disconnected state under the control of the controller 14, so that the battery pack 11 supplies power to the equalization circuit 13 and the collection circuit 12.

As shown in FIG. 1 and FIG. 3, after determining, according to the parameter information of the cell 111 in the battery pack 11, that a cell 111 in the battery pack 11 needs enabling of equalization and determining a target equalization duration of the cell 111 that needs enabling of equalization, the controller 14 transmits an equalization instruction to the equalization circuit 13 to indicate the cell 111 that needs enabling of equalization in the battery pack 11, and the target equalization duration of the cell 111. After the equalization circuit 13 receives the equalization instruction, the second switch 173 changes from the connected state to a disconnected state under the control of the controller 14. That is, when the equalization circuit 13 performs equalization processing on the cell that needs enabling of equalization, the controller 14 controls the second switch 173 to change from the connected state to the disconnected state. Because the cell 111 in the battery pack 11 is connected to the collection circuit 12 and the equalization circuit 13 in a one-to-one correspondence, after the second switch 173 is disconnected, operating power supplies of the collection circuit 12 and the equalization circuit 13 receive power from the cell 111 in the battery pack 11, and the controller 14 operates normally.

Still referring to FIG. 1 and FIG. 3, after the second switch 173 is disconnected, the controller 14 periodically (for example, every 15 s, 20 s or at other intervals) gets into a sleep mode. In the sleep mode, the controller 14 is in an operating state with a low power consumption. When the controller 14 exits the sleep mode, the controller 14 controls the second switch 173 to get connected to obtain the parameter information of the cells 111 in the battery pack 11 and a remaining duration of equalization processing still to be performed by the equalization circuit 13 on the cell 111 that needs enabling of equalization. Further, the controller 14 may adjust, in real time, the equalization processing on the cell 111 that needs enabling of equalization.

Figure 4:
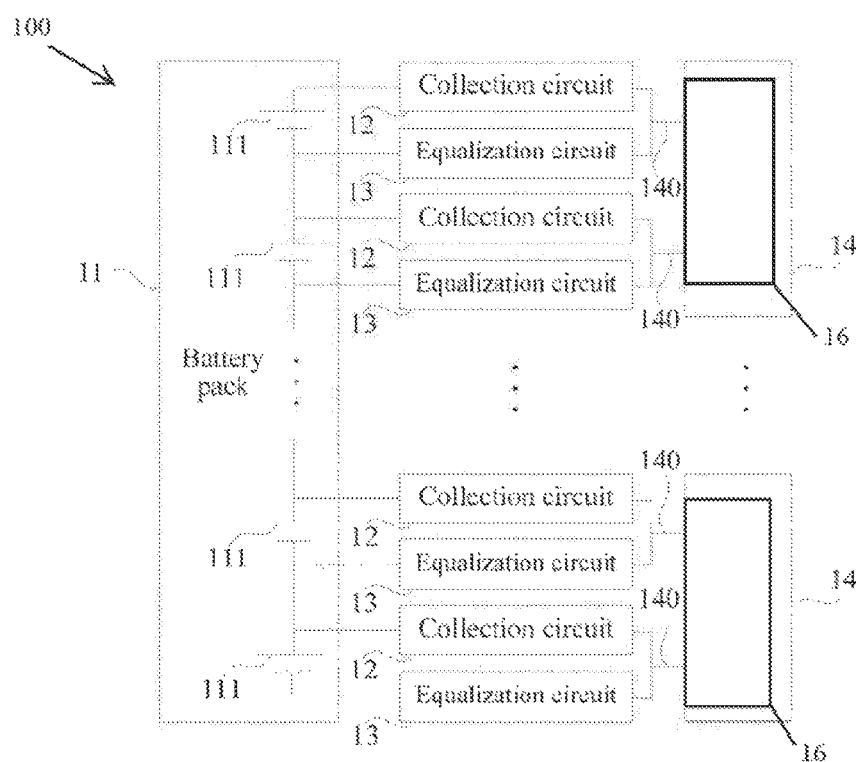
FIG. 4 is another block diagram of a battery equalization unit according to an exemplary embodiment.

FIG. 4 is another block diagram of a battery equalization unit 100 according to an exemplary embodiment. As shown in FIG. 4, FIG. 3, and FIG. 2, the battery equalization system 10 includes a collection circuit 12, an equalization circuit 13, a controller 14, a charging branch circuit 313, a first power supply branch circuit 15, and a second power supply branch circuit 17. The battery pack 11 is multiple cells 111 connected in series. The difference from the battery equalization unit 100 in FIG. 1 lies in that the controller 14 in the battery equalization unit 100 in FIG. 4 is connected through a channel 140 to the collection circuit 12 and the equalization circuit 13 that correspond to the same cell 111.

When the controller 14 determines that the cell 111 needs no equalization, the controller 14 is connected through the channel 140 to the corresponding collection circuit 12; or, when the controller 14 determines that the cell 111 needs equalization, the collection circuit 12 and the equalization circuit 13 that correspond to the cell 111 multiplex the channel 140 in a time division manner. Specifically, the controller 14 includes a control chip 16, the control chip 16 is connected through one pin to the collection circuit 12 and the equalization circuit 13 that correspond to the same cell 111, and the pin is connected to the equalization circuit 12 through the channel 140.

Optionally, as shown in FIG. 4, the controller 14 controls, according to the target equalization duration and an equalization duty cycle, the equalization circuit 13 to perform equalization processing on the cell 111 that needs enabling of equalization, the equalization duty cycle is a ratio of an equalization period of the cell 111 that needs enabling of equalization to a unit cycle, and the unit cycle includes the equalization period and a collection period. In FIG. 4, the equalization duty cycle may also be a ratio of a duration for which the equalization circuit 13 occupies the channel 140 to a total duration for which the channel 140 is occupied. The total duration for which the channel 140 is occupied includes the duration for which the equalization circuit 13 occupies the channel 140 and a duration for which the collection circuit 12 occupies the channel 140.

As shown in FIG. 4, FIG. 3 and FIG. 2, first, the controller 14 connects the channel 140 to the collection circuit 12, and further can control the collection circuit 12 to collect the parameter information of the battery pack 11. Then, the controller 14 is configured to: when it is determined, according to the parameter information of the cell 111 in the battery pack 11, a cell 111 in the battery pack 11 needs enabling of equalization, obtain the target equalization duration and the equalization duty cycle of the cell 111 that needs enabling of equalization, and connect the channel 140 to the equalization circuit 13 corresponding to the cell 111 that needs enabling of equalization. Then, the controller 14 controls the equalization circuit 13 to connect the cell 111 that needs enabling of equalization to a power generator 30 or a storage battery 33 according to the target equalization duration and the equalization duty cycle of the cell 111 that needs enabling of equalization. That is, the controller 14 can control the connection time of the first switch 131 in FIG. 2 or the second switch 135 in FIG. 3 according to the target equalization duration and the equalization duty cycle.

Optionally, the controller 14 determines an equalization period and a collection period according to the target equalization duration and the equalization duty cycle. A sum of the equalization period and the collection period is equal to the total duration for which the channel 140 is occupied. In the collection period, the channel 140 is connected to the collection circuit 12, so that the collection circuit 12 collects the parameter information of the battery pack 11. In the equalization period, the channel 140 is connected to the equalization circuit 13 that needs to perform equalization processing, and the equalization circuit 13 is connected, so that the equalization circuit 13 performs equalization processing on the cell 111 to be equalized in the battery pack 11.

Because the controller in the present application multiplexes one channel in a time division manner with a voltage sampling circuit of each cell and the equalization circuit, the required quantity of channels of the controller is reduced, and hardware cost is reduced. In addition, because battery sampling is separated from equalization, equalization of current does not affect the battery voltage, thereby improving precision of battery voltage sampling.

The sampling circuit and the equalization circuit in the present application may be a sampling circuit and an equalization circuit commonly used in this field.

The present application further provides a vehicle, including the battery equalization system described above. Specific operation manners of each circuit have been described in detail in the embodiments related to the system, and will not be described in detail here.

Figure 5:
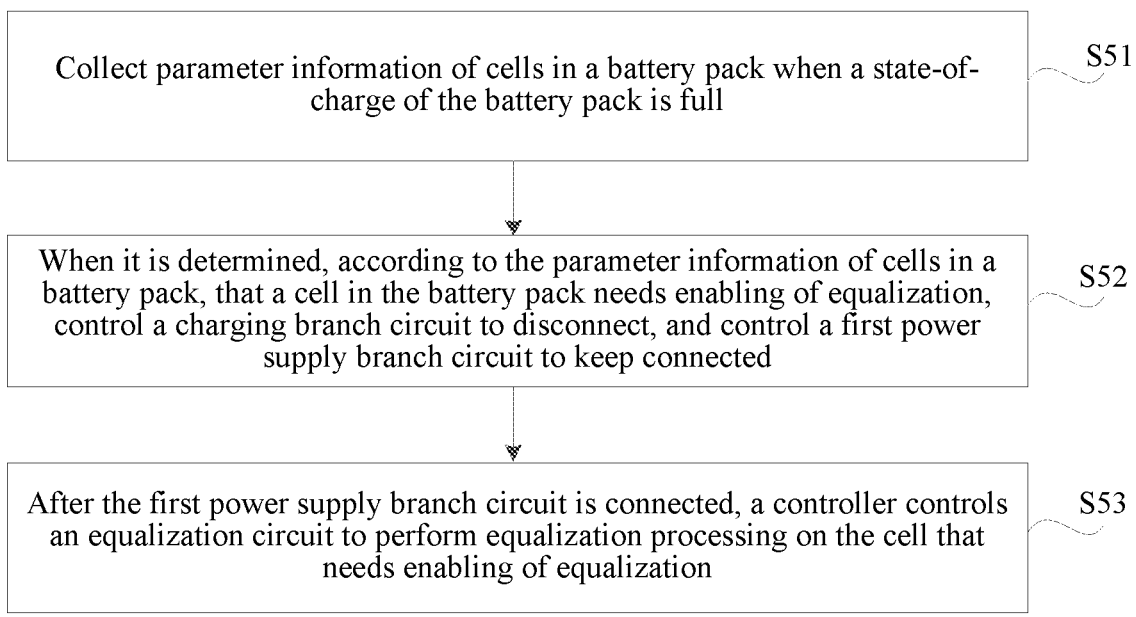
FIG. 5 is a flowchart of a battery equalization method according to an exemplary embodiment.

FIG. 5 is a flowchart of a battery equalization method according to an exemplary embodiment. As shown in FIG. 5, the battery equalization method is applied to a vehicle including the battery equalization system, and the method includes the following steps:

Step S51: Collect parameter information of cells in a battery pack when a state-of-charge of the battery pack is full;

Step S52: When it is determined, according to the parameter information of cells in a battery pack, that a cell in the battery pack needs enabling of equalization, control a charging branch circuit to disconnect, and control a first power supply branch circuit to keep connected; and Step S53: After the first power supply branch circuit is connected, a controller controls an equalization circuit to perform equalization processing on the cell that needs enabling of equalization.

Figure 6:
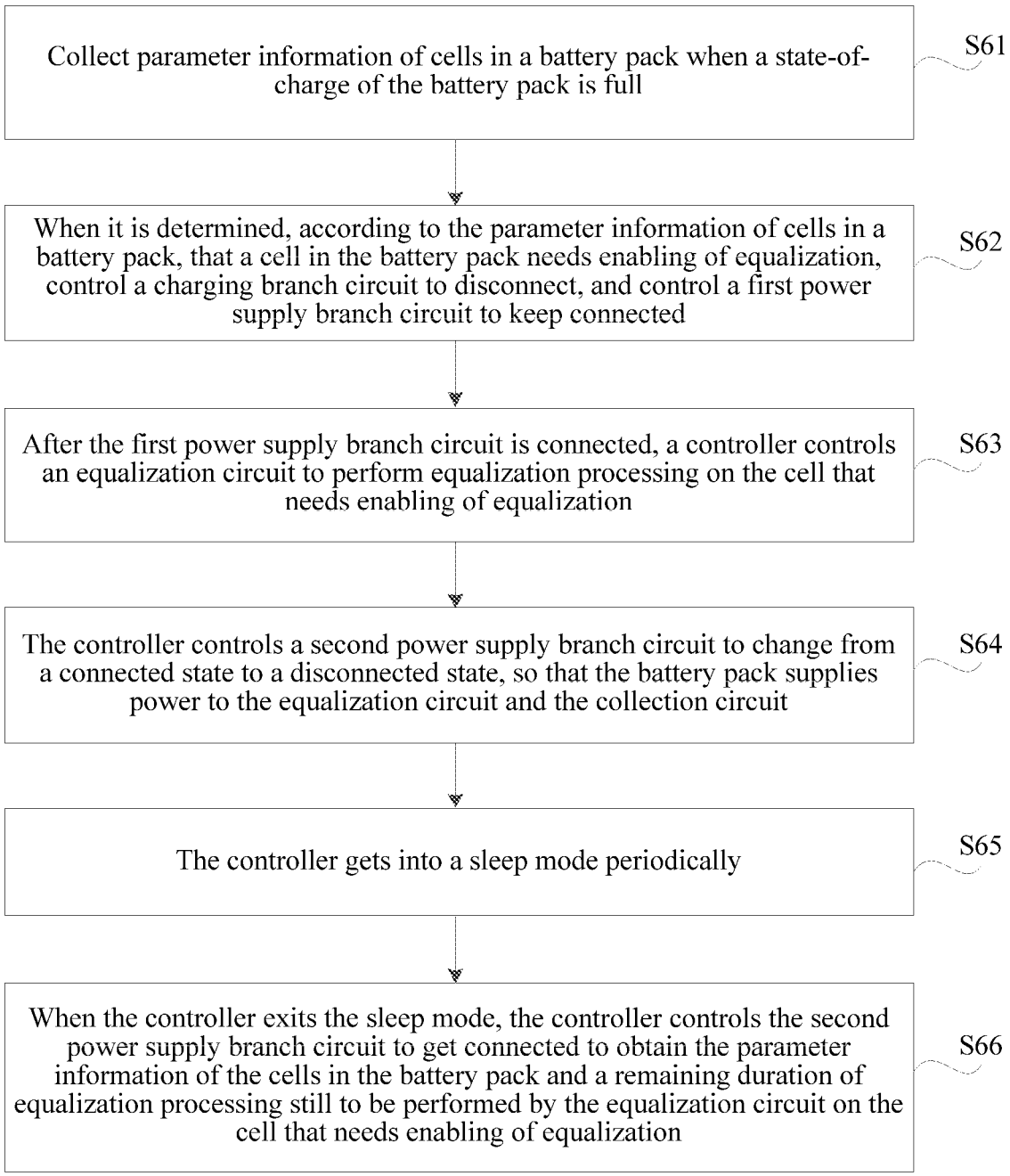
FIG. 6 is another flowchart of a battery equalization method according to an exemplary embodiment.

FIG. 6 is another flowchart of a battery equalization method according to an exemplary embodiment. As shown in FIG. 6, the battery equalization system further includes a second power supply branch circuit. One end of the second power supply branch circuit is connected to the controller, and the other end of the second power supply branch circuit is connected to a collection circuit and the equalization circuit. The method may include the following steps:

Step S61: Collect parameter information of cells in a battery pack when a state-of-charge of the battery pack is full;

Step S62: When it is determined, according to the parameter information of cells in a battery pack, that a cell in the battery pack needs enabling of equalization, control a charging branch circuit to disconnect, and control a first power supply branch circuit to keep connected;

Step S63: After the first power supply branch circuit is connected, a controller controls an equalization circuit to perform equalization processing on the cell that needs enabling of equalization;

Step S64: The controller controls the second power supply branch circuit to change from a connected state to a disconnected state, so that the battery pack supplies power to the equalization circuit and the collection circuit;

Step S65: The controller gets into a sleep mode periodically; and

Step S66: When the controller exits the sleep mode, the controller controls the second power supply branch circuit to get connected to obtain the parameter information of the cells in the battery pack and a remaining duration of equalization processing still to be performed by the equalization circuit on the cell that needs enabling of equalization.

Figure 7:
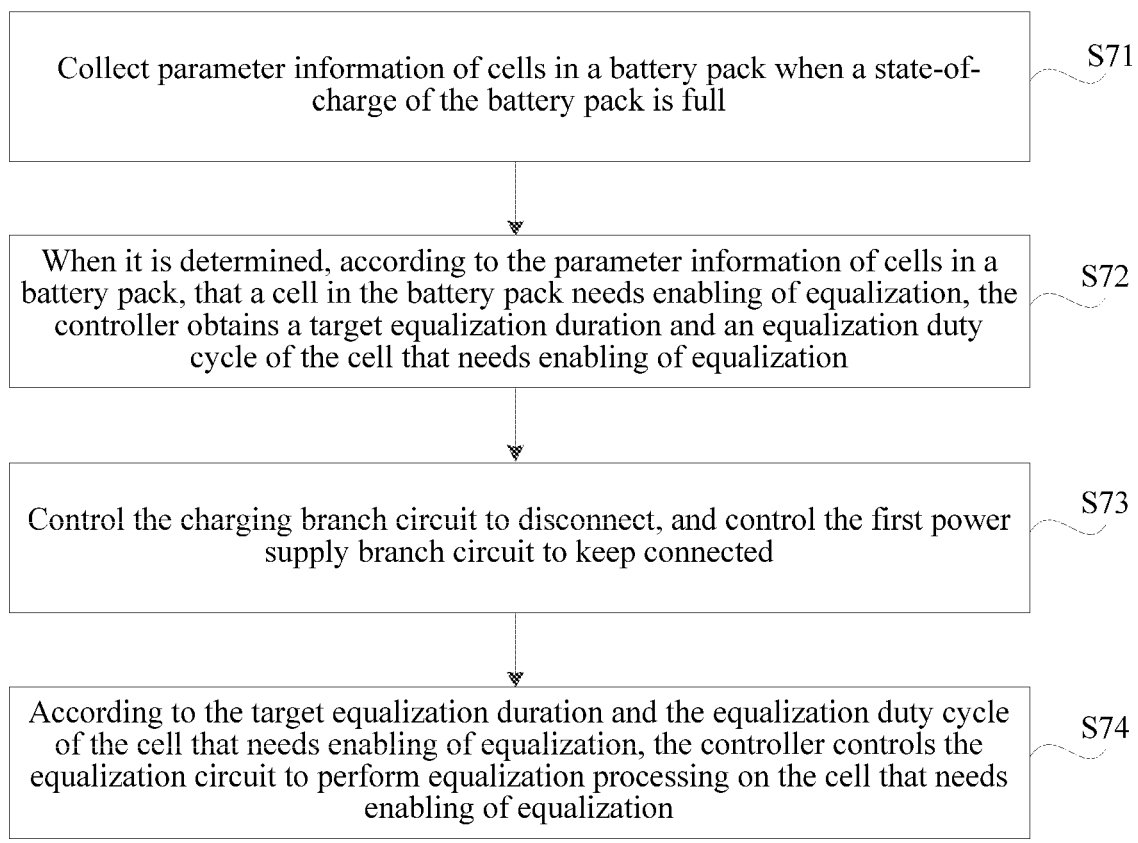
FIG. 7 is another flowchart of a battery equalization method according to an exemplary embodiment.

FIG. 7 is another flowchart of a battery equalization method according to an exemplary embodiment. As shown in FIG. 7, the controller is connected through one channel to the collection circuit and the equalization circuit that correspond to a same cell, and the collection circuit and the equalization circuit multiplex the channel in a time division manner. The method may include the following steps:

Step S71: Collect parameter information of cells in a battery pack when a state-of-charge of the battery pack is full.

Step S72: When it is determined, according to the parameter information of cells in the battery pack, that a cell in the battery pack needs enabling of equalization, the controller obtains a target equalization duration and an equalization duty cycle of the cell that needs enabling of equalization, where the equalization duty cycle is a ratio of a duration for which the equalization circuit occupies the channel to a total duration for which the channel is occupied;

Step S73: Control the charging branch circuit to disconnect, and control the first power supply branch circuit to keep connected; and Step S74: After the first power supply branch circuit is connected, the controller controls, according to the target equalization duration and the equalization duty cycle of the cell that needs enabling of equalization, the equalization circuit to perform equalization processing on the cell that needs enabling of equalization.

Detailed implementation of each step in the battery equalization method in the foregoing embodiment has been described in detail in the embodiment related to the battery equalization system, and will not be described in detail here.

The present application further provides a computer-readable storage medium, on which a computer program instruction is stored. When executed by a processor, the program instruction implements the battery equalization method.

The preferred implementations of the present application have been described in detail above with reference to the accompanying drawings, but the present application is not limited to the specific details in the above implementations. Various simple variations can be made to the technical solutions of the present application within the scope of the technical idea of the present application, and such simple variations shall fall within the protection scope of the present application.

In addition, it should be noted that, the specific technical features described in the foregoing specific implementations may be combined in any appropriate manner without conflict. To avoid unnecessary repetition, various possible combinations are not described in this application.

In addition, various implementations of the present application may be combined without violating the idea of the present application, and such combinations shall also be regarded as the content disclosed in the present application.

What is claimed is:

1. A battery equalization system, comprising:
a battery equalization unit, comprising:
a collection circuit, configured to collect parameter information of cells in a battery pack;
an equalization circuit, configured to perform an equalization processing on the cells in the battery pack;

a controller, connected to the collection circuit and the equalization circuit, and configured to: when it is determined, according to the parameter information of the cells in the battery pack, that a cell in the battery pack needs enabling of equalization, control the equalization circuit to perform the equalization processing on the cell that needs enabling of equalization;

a charging branch circuit, connected to a charging device and the battery pack, and configured to charge the battery pack;

a first power supply branch circuit, connected to the charging device and the battery equalization unit, and configured to supply power to the battery equalization system;

a second power supply branch circuit having one end connected to the controller and a second end connected to the collection circuit and the equalization circuit; and a second switch controlled by the controller and disposed on the second power supply branch circuit, wherein when a state-of-charge of the battery pack is full and a cell in the battery pack needs enabling of equalization, the controller controls the charging branch circuit to disconnect, and controls the first power supply branch circuit to keep connected, so that the equalization circuit performs the equalization processing on the cell that needs enabling of equalization;

after the second switch is changed from a connected state to a disconnected state, the controller periodically gets into a sleep mode; and when the controller exits the sleep mode, the controller controls the second switch to get connected to obtain the parameter information of the cells in the battery pack and a remaining duration of equalization processing still to be performed by the equalization circuit on the cell that needs enabling of equalization.

2. The battery equalization system according to claim 1, wherein the charging branch circuit is connected to a high-voltage direct current output terminal of the charging device, and the first power supply branch circuit is connected to a low-voltage direct current output terminal of the charging device.

3. The battery equalization system according to claim 2, wherein a first switch controlled by the controller is disposed on the first power supply branch circuit, one side of the first switch is connected to the low-voltage direct current output terminal of the charging device, and the other side of the first switch is connected to the controller.

4. The battery equalization system according to claim 1, wherein the second switch keeps connected under the control of the controller.

5. The battery equalization system according to claim 1, wherein when the equalization circuit performs equalization processing on the cell that needs enabling of equalization, the second switch changes from the connected state to the disconnected state under the control of the controller, so that the battery pack supplies power to the equalization circuit and the collection circuit.

6. The battery equalization system according to claim 1, wherein the controller is respectively connected through two channels to the collection circuit and the equalization circuit that correspond to a same cell.

7. The battery equalization system according to claim 6, wherein the controller comprises a control chip, and the control chip is respectively connected through two pins to the collection circuit and the equalization circuit that corresponds to the same cell, the two pins are in one-to-one correspondence with the two channels, one of the two pins is connected to the equalization circuit through one of the two channels, and the other of the two pins is connected to the collection circuit through the other of the two channels.

8. The battery equalization system according to claim 1, wherein the controller is connected through one channel to the collection circuit and the equalization circuit that correspond to a same cell, and the collection circuit and the equalization circuit multiplex the channel in a time division manner.

9. The battery equalization system according to claim 8, wherein the controller comprises a control chip, the control chip is connected through one pin to the collection circuit and the equalization circuit that correspond to the same cell, and the pin is connected to the equalization circuit and the collection circuit through the channel.

10. The battery equalization system according to claim 1, wherein the controller is further configured to: when it is determined, according to the parameter information of the battery pack, that a cell in the battery pack needs enabling of equalization, obtain a target equalization duration of the cell that needs enabling of equalization, and control, according to the target equalization duration of the cell that needs enabling of equalization, the equalization circuit to perform equalization processing on the cell that needs enabling of equalization.

11. The battery equalization system according to claim 10, wherein the controller controls, according to the target equalization duration and an equalization duty cycle, the equalization circuit to perform equalization processing on the cell that needs enabling of equalization, the equalization duty cycle is a ratio of an equalization period of the cell that needs enabling of equalization to a unit cycle, and the unit cycle comprises the equalization period and a collection period.

12. A vehicle, comprising a battery equalization system according to claim 1.

13. The battery equalization method, applied to a vehicle that comprises the battery equalization system according to claim 1, wherein the method comprises:

collecting parameter information of cells in a battery pack when a state-of-charge of the battery pack is full;

controlling, when it is determined, according to the parameter information of cells in a battery pack, that a cell in the battery pack needs enabling of equalization, a charging branch circuit to disconnect, and controlling a first power supply branch circuit to keep connected; and controlling, by a controller, an equalization circuit to perform equalization processing on the cell that needs enabling of equalization.

14. The method according to claim 13, wherein the method further comprises:

controlling, by the controller, the second power supply branch circuit to change from a connected state to a disconnected state, so that the battery pack supplies power to the equalization circuit and the collection circuit.

15. The method according to claim 13, wherein the controller is connected through one channel to the collection circuit and the equalization circuit that correspond to a same cell, and the collection circuit and the equalization circuit multiplex the channel in a time division manner;

the determining that a cell in the battery pack needs enabling of equalization comprises:

obtaining, by the controller when it is determined, according to the parameter information of cells in the battery pack, that a cell in the battery pack needs enabling of equalization, a target equalization duration and an equalization duty cycle of the cell that needs enabling of equalization, the equalization duty cycle is a ratio of an equalization period of the cell that needs enabling of equalization to a unit cycle, and the unit cycle comprises the equalization period and a collection period; and the controlling, by a controller, an equalization circuit to perform equalization processing on the cell that needs enabling of equalization comprises:

controlling, by the controller according to the target equalization duration and the equalization duty cycle of the cell that needs enabling of equalization, the equalization circuit to perform equalization processing on the cell that needs enabling of equalization.

16. A computer-readable storage medium on which a computer program instruction is stored, wherein the program instruction implements the battery equalization method according to claim 13 when executed by a processor.

17. A battery equalization method, comprising:

collecting, using a collection circuit, parameter information of cells in a battery pack when a state-of-charge of the battery pack is full;

controlling, when it is determined, according to the parameter information of cells in a battery pack, that a cell in the battery pack needs enabling of equalization, a charging branch circuit connected to a charging device and the battery pack to disconnect, and controlling a first power supply branch circuit to keep connected to the charging device and a battery equalization unit, controlling, by a controller, an equalization circuit to an perform equalization processing on the cell that needs enabling of equalization;

controlling, by the controller, a second power supply branch circuit having one end connected to the controller, and the other end connected to the collection circuit and the equalization circuit to change from a connected state to a disconnected state, so that the battery pack supplies power to the equalization circuit and the collection circuit;

when the second power supply branch circuit is disconnected, getting into a sleep mode periodically by the controller; and controlling, by the controller when the controller exits the sleep mode, the second power supply branch circuit to get connected to obtain the parameter information of the cells in the battery pack and a remaining duration of the equalization processing still to be performed by the equalization circuit on the cell that needs enabling of equalization.

* * * * *